April 10, 1962　　　T. D. KORANYE　　　3,029,423
VOLTAGE MONITOR
Filed May 18, 1960
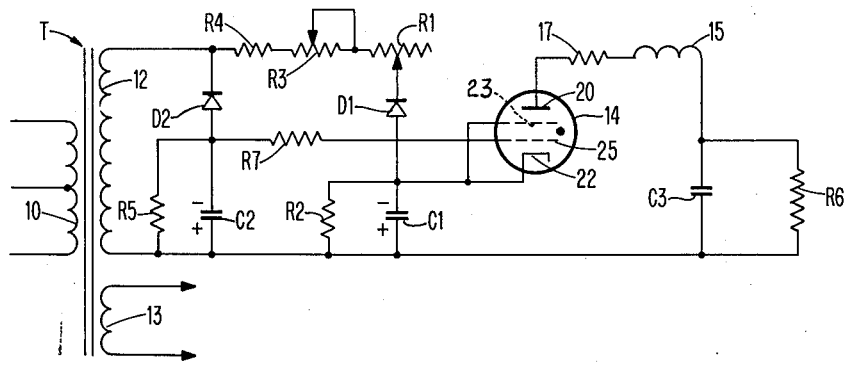
FIG. 1
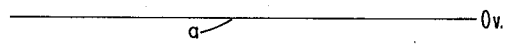
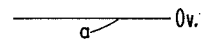
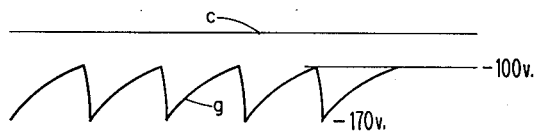
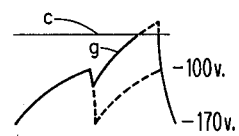
FIG. 2　　　　　　FIG. 3
*INVENTOR*
THEODORE D. KORANYE
BY *Francis U. Giolma*
*ATTORNEY*

United States Patent Office 3,029,423
Patented Apr. 10, 1962

3,029,423
VOLTAGE MONITOR
Theodore D. Koranye, Vestal, N.Y., assignor to International Business Machines Corporation, New York, N.Y., a corporation of New York
Filed May 18, 1960, Ser. No. 29,912
7 Claims. (Cl. 340—253)

This invention relates generally to voltage monitors, and it has reference in particular to a transient low voltage detector.

In the operation of modern computing machines and the like, the operation of many components and in particular many of the solid state logic components may be adversely affected by transient changes in line voltage which may be of such short duration as to be incapable of being detected by recording volt meter or the like.

It is the purpose of this invention to provide a transient voltage detector that is simple and inexpensive to manufacture and is yet reliable in operation.

Another object of this invention is to provide a compact type transient voltage dip detector that may be easily carried in the pocket and is yet efficient and accurate in operation.

It is also an object of this invention to provide a relatively flexible transient voltage dip recorder that may be readily adjusted to determine the number or frequency of transient conditions of many different values.

A further object of the invention is to provide a relative measure of voltage dips on a power supply.

Yet another object of this invention is to provide a compact and efficient transient counter with a high degree of sensitivity.

It is also an object of this invention to provide for detecting momentary dips in line voltage of an alternating current source responding to slow variations in the voltage thereof.

The foregoing and other objects, features and advantages of the invention will be apparent from the following more particular description of a preferred embodiment of the invention, as illustrated in the accompanying drawings.

In the drawings:

FIG. 1 is a schematic diagram of a transient voltage dip detector embodying the invention in one of its forms.

FIG. 2 shows a set of characteristic grid and cathode voltage curves.

FIG. 3 shows a variation in the grid voltage relative to the cathode voltage for a typical operation of the detector.

Referring particularly to FIG. 1, it will be seen that a transformer T is provided having a primary winding 10 for connection to a suitable source of alternating current and having a secondary winding 12 together with a filament winding 13. A gaseous discharge device, such as a thyratron 14, is utilized for connecting the operating magnet 15 of a counter to the secondary winding 12 of the transformer. The magnet 15 is connected through a current limiting resistor 17 to the anode 20 of the thyratron, while the cathode 22 is connected to the secondary winding 12 through an RC circuit including a resistor R2 and a filter capacitor C1 and a diode D1. The screen grid 23 is connected to the cathode 22. An adjustable resistor R1, a calibrating resistor R3, and a suitable resistor R4 are utilized to complete the connection of the cathode to the transformer so as to provide a well-filtered direct current voltage on the cathode which does not readily change with momentary changes in the voltage of the source.

In order to provide for detecting momentary changes in the voltage of the source, the control grid 25 of the thyratron 14 is connected to the secondary winding through a current limiting grid resistor R7 and an RC circuit including a resistor R5 and a capacitor C2, together with a diode D2. The capacitor C2 is of a relatively small value so as to impart a somewhat saw-toothed characteristic to the grid voltage as shown by the curve g in FIG. 2. The voltage of the cathode 22 is represented by the curve c and may, as will be seen, comprise a substantially constant direct current potential. The voltage of the anode 20 is represented by the curve a. An RC circuit including a capacitor C3 and a resistor R6 may be connected in the anode circuit of the thyratron to make it self-extinguishing after passing a sufficient current pulse to operate the magnet 15.

In operation, the voltage of the cathode 22 is adjusted by means of the adjustable resistor R1 to be more positive than the lowest normal excursion of the pulsating direct current voltage on the grid 25, as shown in FIG. 2, thus keeping the thyratron normally cut off. Since the grid is supplied by a poorly filtered rectified alternating current whose average negative value is dependent upon the line voltage, the grid 25 will sense an instantaneous dip in even one cycle of the alternating current wave and allow the grid voltage to rise and tend to become more positive than that of the cathode as shown by the grid voltage curve g in FIG. 3. The cathode voltage cannot respond so rapidly because of the delay introduced by the value of C1. The thyratron 14 therefore conducts and energizes the counter magnet 15 during the charging of the capacitor C3, which is of such capacity as to pass a charging current of a value and for the time necessary to operate the counter, whereupon the capacitor operates to extinguish the thyratron when it becomes charged.

The threshold value of the cathode voltage is readily adjusted to vary the sensitivity of the device to voltage dips of varying values by adjusting the value of the adjustable resistor R1. The calibrating resistor R3 may be utilized to calibrate particular adjustments of the resistance R1 for different values of voltage. The repetition rate of the counter may be varied by changing the value of C1 in either direction within limits or by varying the values of R2 and R1, R3, R4 together, without changing the threshold level since the repetition rate of the counter depends primarily on the values of R2 and C1 in the cathode supply.

In one embodiment of the invention, using a Veeder-Root counter D159104 the following are typical values with a 2D21 thyratron:

| | |
|---|---|
| R1 | 5K |
| R3 | 2K |
| R4 | 3.6K |
| R5 | 51K |
| R2 | 30K |
| R6 | 20K |
| R7 | 40K |
| C1 microfarads | 32 |
| C2 do | .5 |
| C3 do | 10 |
| R17 ohms | 470 |

For these values the repetition rate of the circuit is about one count per second. Due to the fairly stable cut-off characteristics of the 2D21, this circuit has high sensitivity and ability to operate the counter on a 10 microsecond pulse reliably. The response characteristics of the monitor may be readily adjusted by utilizing different values of R1, R2, C1, and to a lesser extent by adjusting R6, C3.

From the above description, and the accompanying drawings, it will be apparent that a voltage monitor is provided having a relatively high degree of sensitivity and ability to record voltage dips of relatively short duration. A circuit embodying the features disclosed is relatively simple and comprises relatively few components.

Such a circuit is relatively sensitive and yet is fairly stable in its operation. While the circuit described has been shown as applied to the measurement of negative surges of voltage, a similar logic can be applied by using a separate winding on the transformer for the grid to sense only positive surges within the scope of the invention.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Voltage monitoring apparatus for determining transient conditions of a monitored voltage source including a counter device, switch means connected to effect operation of the counter device from the source, said switch means having a cathode and a control electrode, circuit means including rectifier means and a sufficiently large capacitor connecting the cathode and the source to establish a stable voltage reference level for the cathode, and means connecting the control electrode to the source independently of said circuit means to permit voltage variations of the source to be applied to said electrode for effecting operation of the switch means in response to predetermined changes in the source voltage.

2. In voltage monitoring apparatus for determining transient variations in the voltage of a source, a counter device, switch means connected between the source and the counter device to effect operation of the counter device, said switch means having a cathode and a control electrode, delay circuit means connecting the cathode to the source to apply a stable reference voltage to the cathode, and circuit means connecting the control electrode to the same source independently of the delay circuit means for applying to the control electrode a voltage which varies with the source voltage.

3. Voltage monitoring apparatus for determining transient dips in the voltage of a source comprising a counter, means including a self-extinguishing gaseous switch device connecting the counter to the source and having a cathode and a control electrode, means including a rectifier and a relatively large filter capacitor connecting the cathode to the source to apply a relatively stable reference voltage to the cathode from said source, and other circuit means connecting the control electrode to the source independently of said filter capacitor for applying a voltage to the control electrode which fluctuates with source transient variations.

4. Voltage monitoring means for counting voltage excursions of a voltage source comprising a counter, a thyratron switch device connecting the counter to the source, said device including a cathode, anode and control electrode, circuit means including an adjustable resistance device, a rectifier device, and a relatively large filter capacitor so connecting the cathode to the source as to permit varying the cathode level and preventing rapid fluctuations thereof with fluctuations in the source voltage, and means including an additional rectifier device so connecting the control electrode to the source independently of said filter capacitor that the control electrode voltage follows rapid fluctuations of the source.

5. The combination with a transformer having a primary winding and a secondary winding, of a counter, a self-extinguishing thyratron switch device having an anode-cathode circuit connecting the counter to be energized from the secondary winding, and having a control electrode, means including a heavily filtered rectifier circuit connecting the cathode to the secondary winding to apply a substantially stable voltage to the cathode from said source, and additional circuit means including a rectifier and a relatively small filter capacitor connecting the control electrode to the secondary winding for applying a poorly filtered rectified voltage to the control electrode whose average value is dependent on and varies with transient variations of the secondary voltage.

6. In combination, a counter device, means including a thyratron device having an anode-cathode circuit connecting the counter device to an alternating current source of voltage, means including a rectifier device and a relatively large filter capacitor and adjustable impedance means connecting the cathode to the source to provide a substantially constant voltage level for the cathode which is independent of transient voltage fluctuations of the source, and means including a rectifier device and a relatively small capacitor connecting the control electrode to the source independently of the said relatively large filter capacitor for variation with the instantaneous value of the source voltage.

7. In a voltage monitor for a source of alternating current voltage, a counter, a gaseous discharge device having a cathode and anode connected in series circuit with the counter and the source and having a control electrode, circuit means including a rectifier and a relatively small filter capacitor connecting the control electrode to the source for maintaining it at a voltage whose average value is dependent on and follows transient fluctuations in the source voltage, additional circuit means including a rectifier and a relatively large capacitor connecting the cathode to the source to prevent rapid fluctuations in the voltage level of the cathode, and adjustable impedance means connected in circuit with the cathode and the additional circuit means for adjusting the cathode voltage level relative to the control electrode voltage for varying the sensitivity of the circuit to different values of voltage variations.

References Cited in the file of this patent

UNITED STATES PATENTS

| 2,669,855 | Lebocey | Feb. 23, 1954 |
| 2,775,752 | Hoberman | Dec. 25, 1956 |
| 2,832,915 | McCoy | Apr. 29, 1958 |
| 2,845,582 | Koss | July 29, 1958 |